US012117146B2

(12) United States Patent
Bellis et al.

(10) Patent No.: US 12,117,146 B2
(45) Date of Patent: Oct. 15, 2024

(54) SPOTLIGHT HEADLAMP

(71) Applicant: Optimal Ventures, LLC, Arlington Heights, IL (US)

(72) Inventors: Avery Bellis, Chicago, IL (US); Dan Williams, Wood Dale, IL (US); Conner Acevedo, Huntley, IL (US)

(73) Assignee: Optimal Ventures, LLC, Arlington Heights, IL (US)

( * ) Notice: Subject to any disclaimer, the term of this patent is extended or adjusted under 35 U.S.C. 154(b) by 0 days.

(21) Appl. No.: 18/184,278

(22) Filed: Mar. 15, 2023

(65) Prior Publication Data

US 2023/0296230 A1 Sep. 21, 2023

Related U.S. Application Data

(60) Provisional application No. 63/269,672, filed on Mar. 21, 2022.

(51) Int. Cl.

| | |
|---|---|
| ***F21V 21/084*** | (2006.01) |
| ***F21L 4/00*** | (2006.01) |
| ***F21V 29/70*** | (2015.01) |
| *F21Y 103/10* | (2016.01) |
| *F21Y 115/10* | (2016.01) |

(52) U.S. Cl.

CPC ............ *F21V 21/084* (2013.01); *F21L 4/005* (2013.01); *F21V 29/70* (2015.01); *F21Y 2103/10* (2016.08); *F21Y 2115/10* (2016.08)

(58) Field of Classification Search

CPC ......... F21V 21/084; F21V 29/70; F21L 4/005

See application file for complete search history.

(56) References Cited

U.S. PATENT DOCUMENTS

| | | | | |
|---|---|---|---|---|
| 5,558,428 | A | 9/1996 | Lehrer et al. | |
| 9,155,168 | B2 * | 10/2015 | Araujo | F21L 4/005 |
| 9,388,952 | B2 | 7/2016 | Patel et al. | |
| 9,693,425 | B2 | 6/2017 | Feustel et al. | |
| 10,253,964 | B2 | 4/2019 | Strong et al. | |
| 10,955,119 | B2 | 3/2021 | Cheng | |
| 11,215,343 | B2 | 1/2022 | Gall et al. | |
| 2011/0261556 | A1 * | 10/2011 | Gibson | F21V 29/70 362/105 |
| 2018/0058681 | A1 * | 3/2018 | Arave | F21V 21/084 |

(Continued)

OTHER PUBLICATIONS

One80, New One80 Headlamp—180°+ Focused Directional Illumination, Oct. 18, 2021.

(Continued)

*Primary Examiner* — Evan P Dzierzynski
*Assistant Examiner* — Nathaniel J Lee
(74) *Attorney, Agent, or Firm* — Bishop Diehl & Lee, Ltd.

(57) ABSTRACT

An improved headlamp having a wearable headband configured to wrap about a user's head, an array of lights attached to the headband to direct a wide band of light outward, a directional spotlight attached to the headband to direct a narrow beam of light—relative to the wide band from the array of lights—and a heat sink configured to dissipate heat from the directional spotlight. The array of lights and spotlight preferably include an LED strip and at least one LED PCB, respectively. The heat sink is preferably comprised of a housing frame and/or fastening hardware for the directional spotlight.

10 Claims, 9 Drawing Sheets

(56) References Cited

U.S. PATENT DOCUMENTS

| | | | | |
|---|---|---|---|---|
| 2021/0033266 | A1* | 2/2021 | Cheng | F21V 23/0414 |
| 2021/0332972 | A1 | 10/2021 | Hur | |

OTHER PUBLICATIONS

PeachLeaf, LED Headlamp, PeachLeaf Rechargeable Headlamp Flashlight 270° Illumination Wide Beam Headlamp 1000 Lumen Super Bright 6 Modes&Motion Sensor Waterproof Headlight for Running Camping Fishing, Hard Hat, Jan. 25, 2022.
Simply Serve, LED Headlamp Wide Angle Beam Pro Flashlight, Jan. 25, 2022.
Illumagear, HALO™ SL, Jan. 25, 2022.
Hokolite, 1200 Lumens 210° Wide Beam COB Rechargeal de He mp ith Motion Sensor Grey, Jan. 25, 2022.

* cited by examiner

SPOTLIGHT HEADLAMP

RELATED APPLICATION

The present application claims the filing priority of Provisional Application No. 63/269,672, titled "Spotlight Headlamp," and filed on Mar. 21, 2022. The '672 Provisional application is hereby incorporated by reference.

TECHNICAL FIELD OF THE INVENTION

The present invention relates to wearable light sources. More specifically, the invention relates to a headlamp having a movable spotlight and a light array for broad light projection.

BACKGROUND OF THE INVENTION

For people who like to go camping, hiking, backpacking, climbing, mountain biking, trail running, or nearly anything else in the outdoors, and for those who like to tackle the occasional do-it-yourself project, home repair, and the like, a wearable headlamp is a valuable, if not necessary piece of equipment. Replacing the handheld flashlight as a ready source of illumination, the headlamp is a very handy piece of technology which has increased in popularity over the past few years. The industry has increased maximum light output (rated in lumens), battery options, water-resistance, and many other features which have benefitted users.

However, with the push to increase light output, the industry has failed to consider the consequences of increased heat as well. Even with the use of LEDs, which have a considerably lower heat output than other light sources, the proximity of the light component to a user for maximum benefit can create discomfort, particularly when worn around the head.

Until the invention of the present application, these and other problems in the prior art went either unnoticed or unsolved by those skilled in the art. The present invention provides an improved headlamp which outperforms prior art devices without sacrificing portability features, design, style or affordability.

SUMMARY OF THE INVENTION

There is disclosed herein an improved headlamp which avoids the disadvantages of prior devices while affording additional structural and operating advantages.

Generally speaking, the improved headlamp comprises a band configured to removably attach to a user, preferably about the user's head, an array of lights attached to the headband to direct a wide band of light outward, a spotlight attached to the headband to direct a narrow beam of light, and a heat sink configured to dissipate heat from the directional spotlight away from the user.

Preferably, the array of lights have a length of from about 3 inches to about 12 inches and the spotlight is positioned proximate the middle point of the length.

In specific embodiments, the array of lights comprises an LED strip and the directional spotlight comprises at least one LED.

In other specific embodiments, the heat sink comprises a housing frame and/or fastening hardware for the directional spotlight.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings and appendices, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
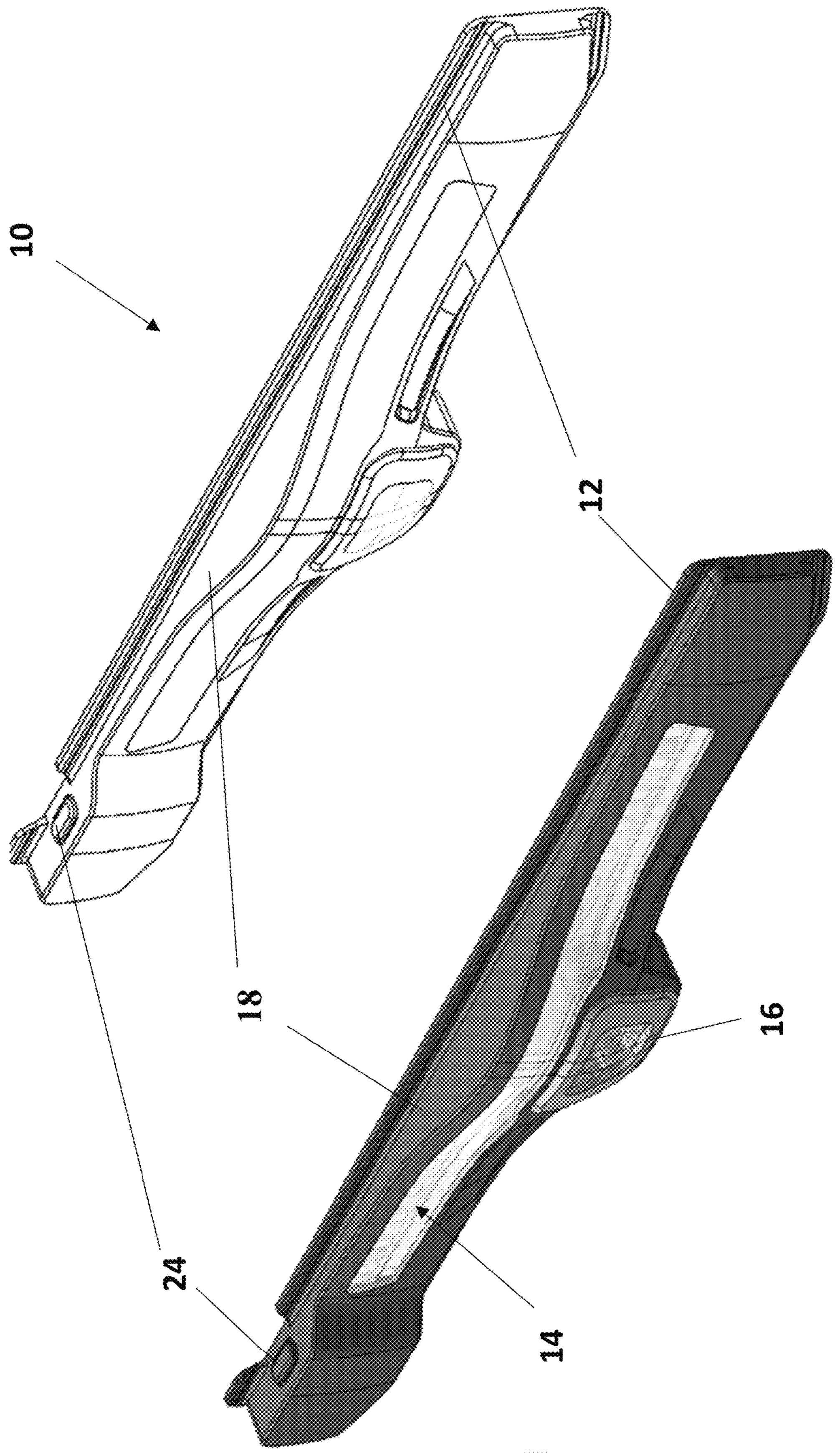
FIG. 1 is a front isometric view of a color image and a line drawing of an embodiment of the disclosed headlamp.

While this invention is susceptible of embodiments in many different forms, there is shown in the drawings and appendices and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIGS. 1-9, there is illustrated at least one embodiment of a new headlamp, generally designated by the numeral 10. The particular illustrated headlamp 10 includes both a wide light array and a directional spotlight. In fact, while all the embodiments illustrated are directed to a wearable headlamp 10 for a user's head, it should be understood that the principles of the invention can be more broadly applied to a device which can be worn on various areas of a user's body, as well attached to clothing, hats, helmets and even stationary objects, such as tents, poles, trees, and the like.

Figure 2:
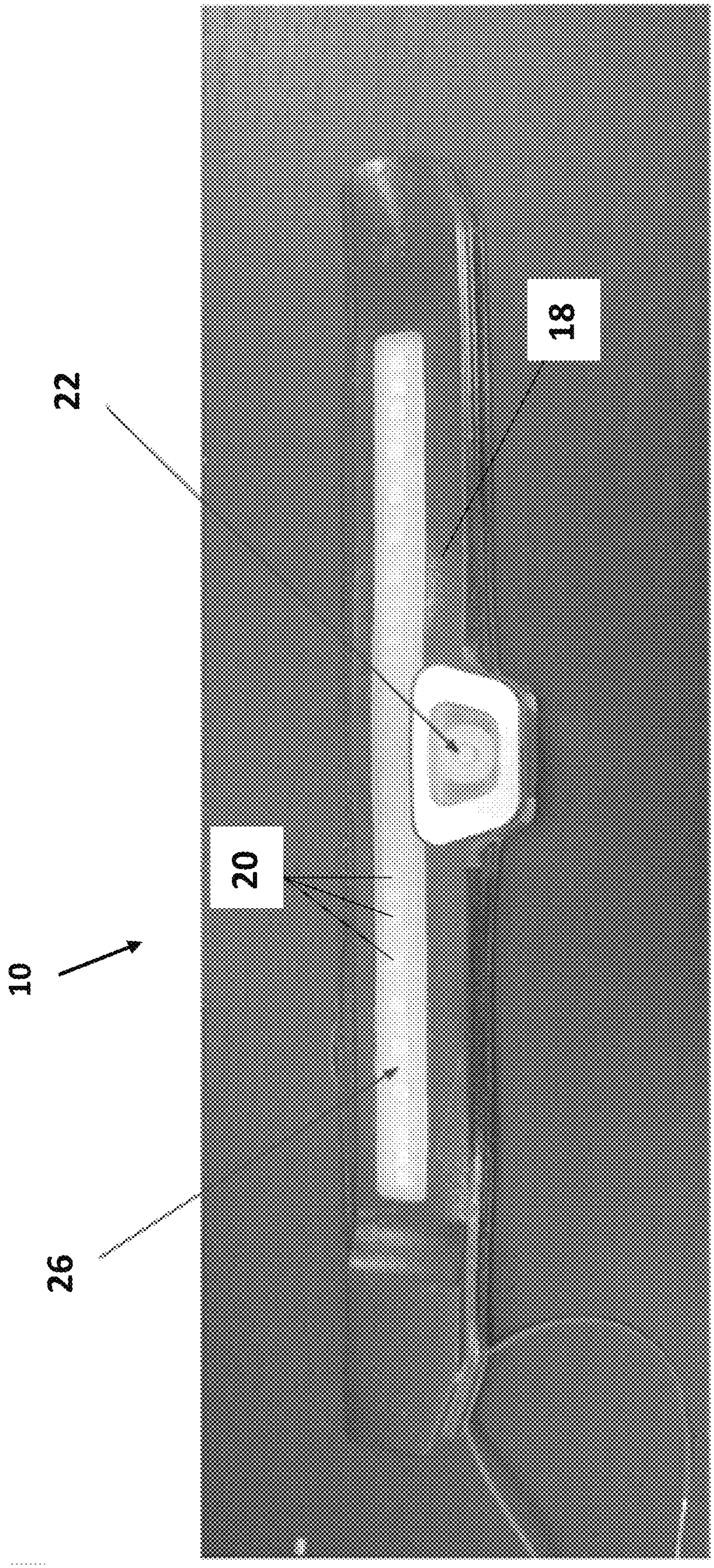
FIG. 2 is a front view of an embodiment of the disclosed headlamp.

As can be seen in FIGS. 1 and 2, the headlamp 10 is comprised of a narrow band 12, a first light source 14 extending along a length of the band 12, and a second light source 16 positioned proximate a midpoint and below the first light source 14. The band 12 is comprised of a flexible body portion 18, capable of bending about a curved surface (e.g., a user's head), and generally houses the two light sources, 14 and 16. The flexible body portion 18 is preferably attachable to an elastic and/or adjustable portion (not shown) which can be equipped with releasable connectors at each free end, so as to be formable into a closed loop about a body (e.g., a user's head). Preferably, the first light source 14 is comprised of an array of LEDs 20 positioned linearly within a length of the band 12. The second light source 16 is preferably comprised of a directional spotlight 22, which may also include LEDs. An "on/off" switch 24 is preferably positioned along a top surface of the flexible body portion 18 to permit toggling operation of the light sources, 14 and 16. The two light sources, 14 and 16, can be configured to operate either separately or together, as desired. For example, one "click" of the switch 24 activates the first light source 14, two clicks activates the second light source 16 and deactivates the first light source 14, a third click activates both light sources, 14 and 16, and a fourth click deactivates both light sources.

As shown in FIG. 2, the first light source 14 is comprised of an array of LEDS 20 as provided by an LED strip 26. The LED strip 26 has a length preferably within the range of about 3 inches to about 12 inches (about 7.6 cm to 30.5 cm), but most preferably in the range of 4 inches to 8 inches (about 10.2 cm to 20.4 cm). Increasing the length of the strip 26 creates a larger wide-band light projection from the headlamp 10. Conversely, shortening the length of the strip 26 will lessen the overall arc of the projected light band.

Figure 3:
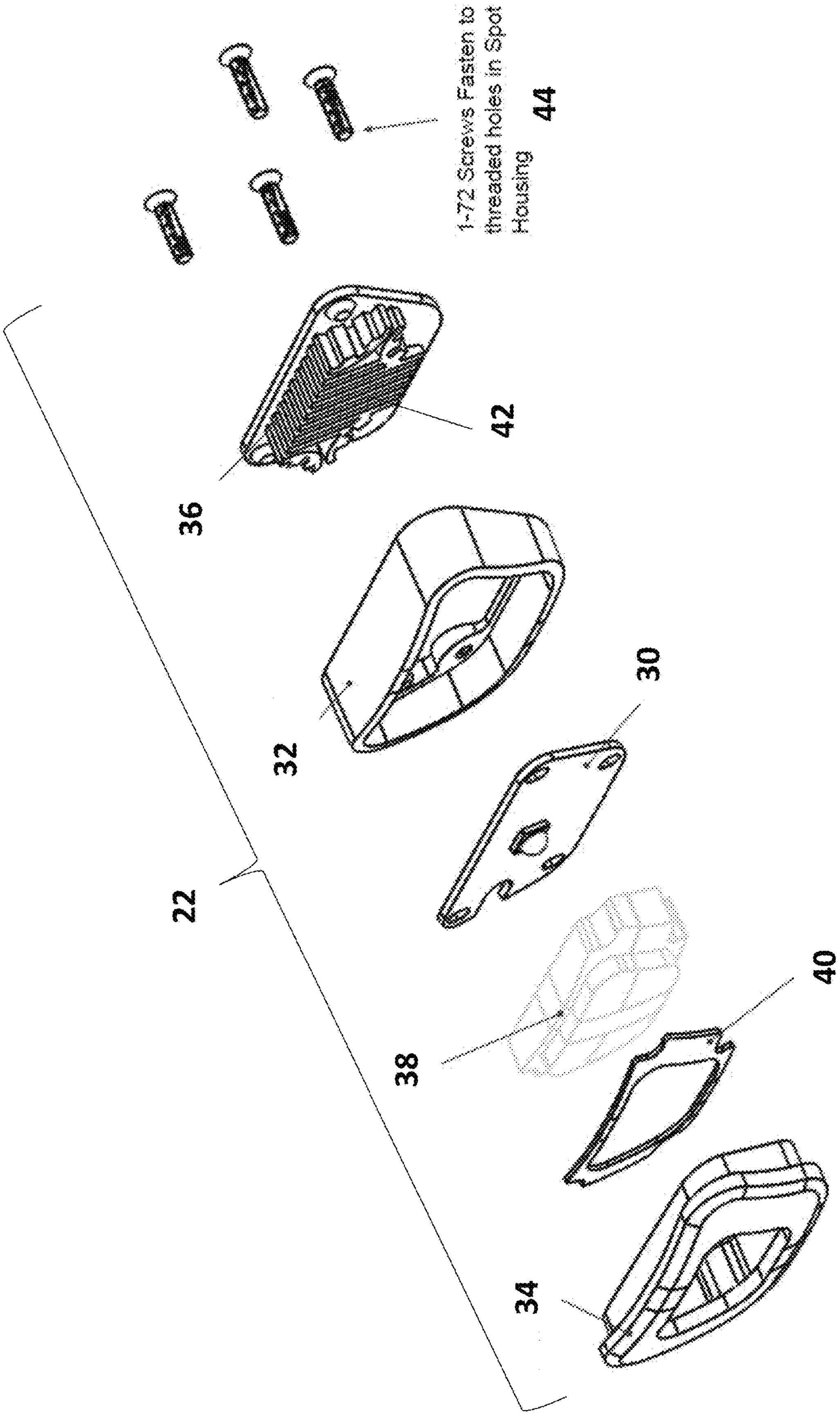
FIG. 3 is an exploded view of an embodiment of a spotlight for the disclosed headlamp.
Figure 8:
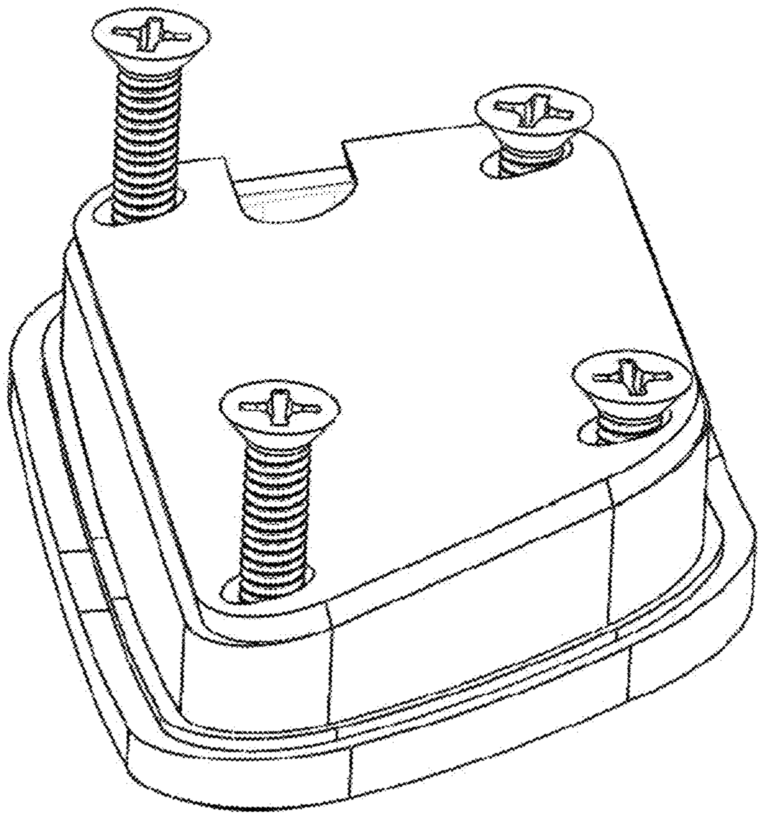
FIG. 8 is a rear isometric view of an embodiment of the disclosed spotlight.
Figure 9:
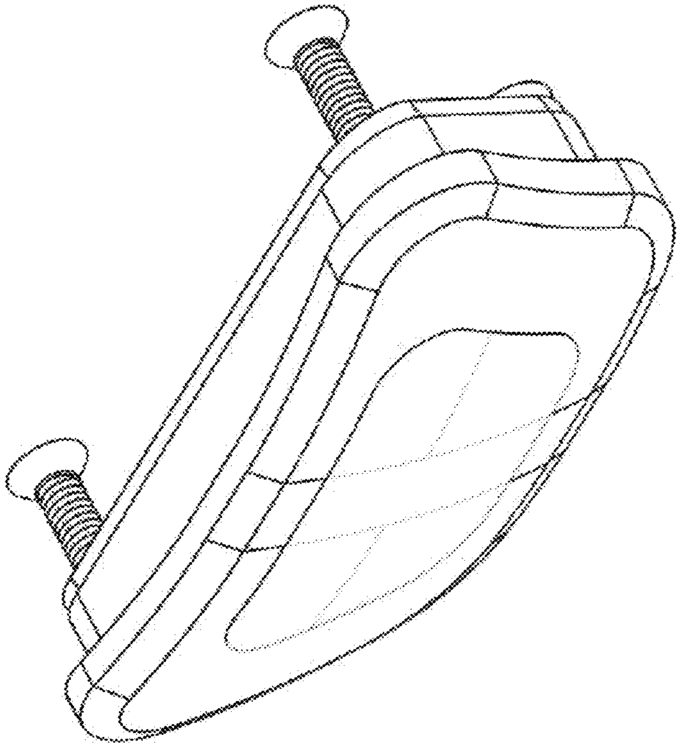
FIG. 9 is a front isometric view of the spotlight of FIG. 8.

Referring to FIG. 3, an embodiment of the second light source 16 is shown in greater detail. The exploded view illustrates a spotlight LED PCB 30 enclosed with frame 32 and front and rear housing plates, 34 and 36, respectively. A polycarbonate lens 38 is positioned at the front housing plate 34 to allow projection of a light beam forward and outward, relative to the band 12. A gasket 40 is used to seal the lens 38 against the metal front housing plate 34. As will be explained below, the metal front housing plate 34 is preferably made of aluminum or an aluminum alloy which provides significant heat conduction. The rear housing plate 36 and frame 32 are comprised of a non-metal, more preferably of a thermoplastic material, to minimize heat conduction. Most preferably, the frame 32 is formed of acrylonitrile butadiene styrene and the rear housing plate 36 is formed of a thermoplastic elastomer. The rear housing plate 36 is also comprised of protrusions 42 which are sloped in a manner so as to tilt the LED PCB 30 downward. As best illustrated in FIG. 8, four metal screws 44 are used to connect the rear housing plate 36, frame 32, and LED PCB 30 to the front housing plate 34.

Figure 4B:
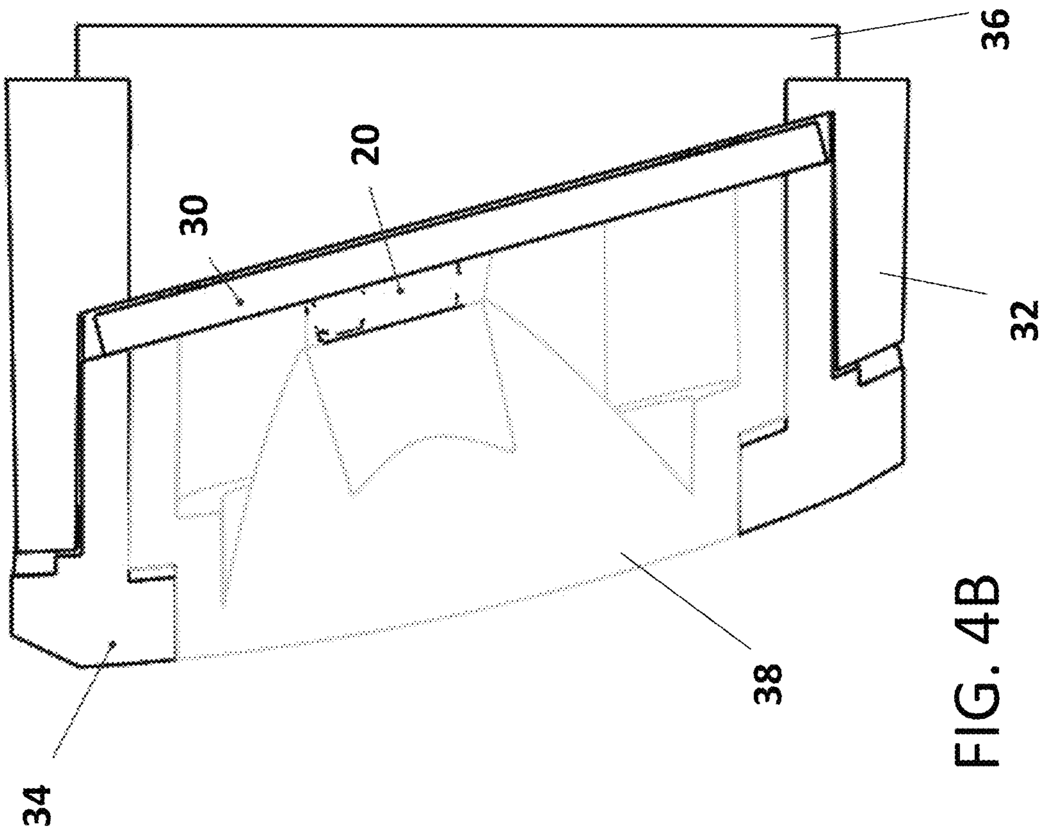
FIG. 4B is a cross-sectional view of the embodiment of FIG. 4A taken along line B-B.
Figure 4A:
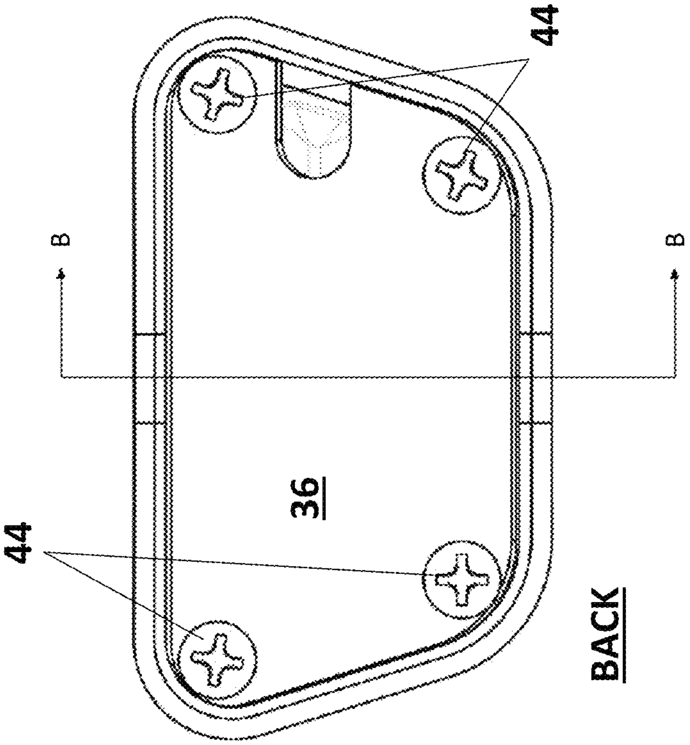
FIG. 4A is a rear view of an embodiment of a directional spotlight for the disclosed headlamp.
Figure 5B:
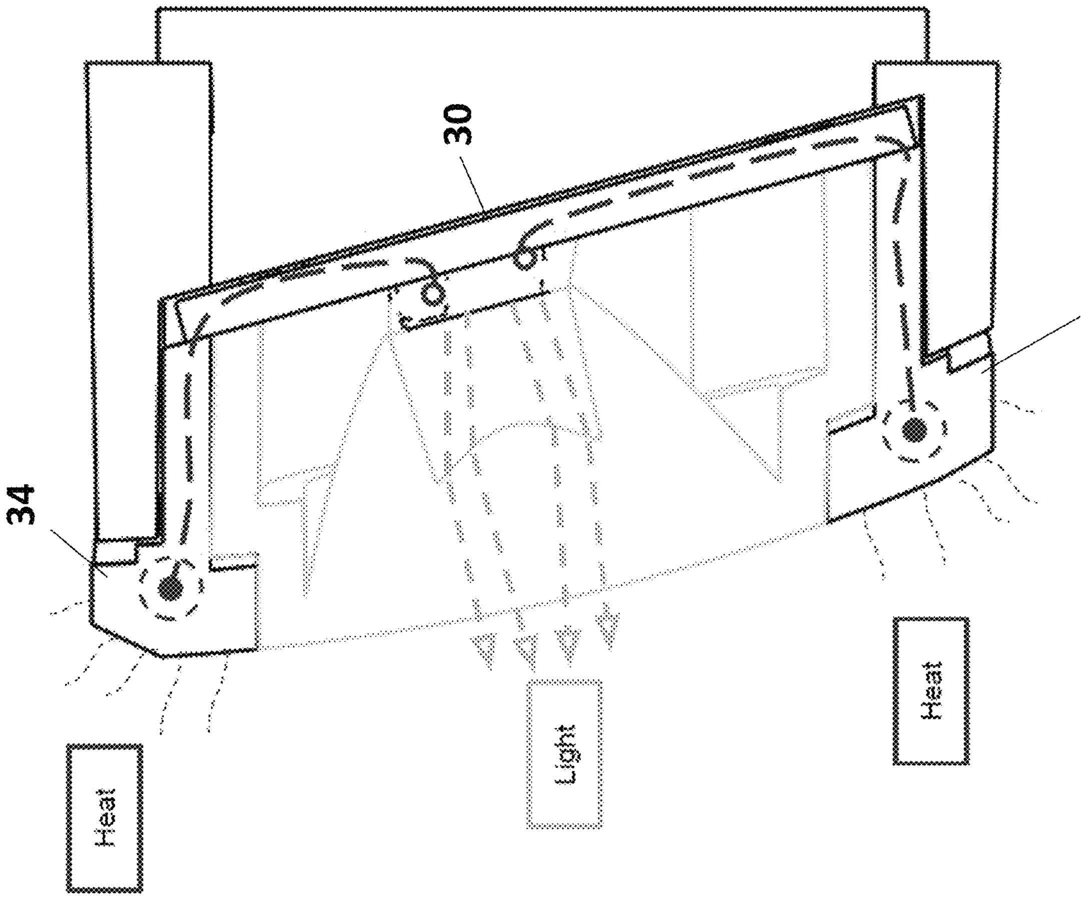
FIG. 5B is a cross-sectional view of the spotlight of FIG. 5A taken along line B-B, illustrating dissipation of heat through the heat sink.
Figure 5A:
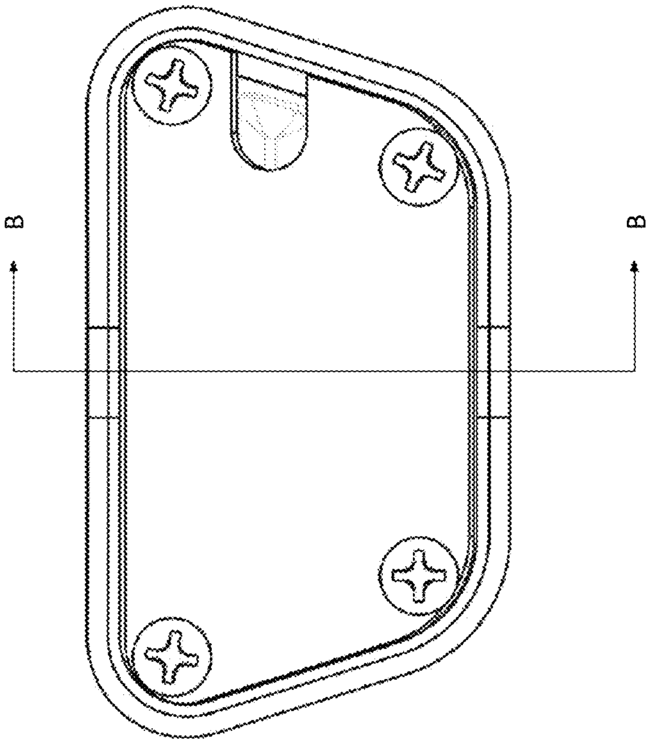
FIG. 5A is a rear view of an embodiment of a directional spotlight for the disclosed headlamp.
Figure 6B:
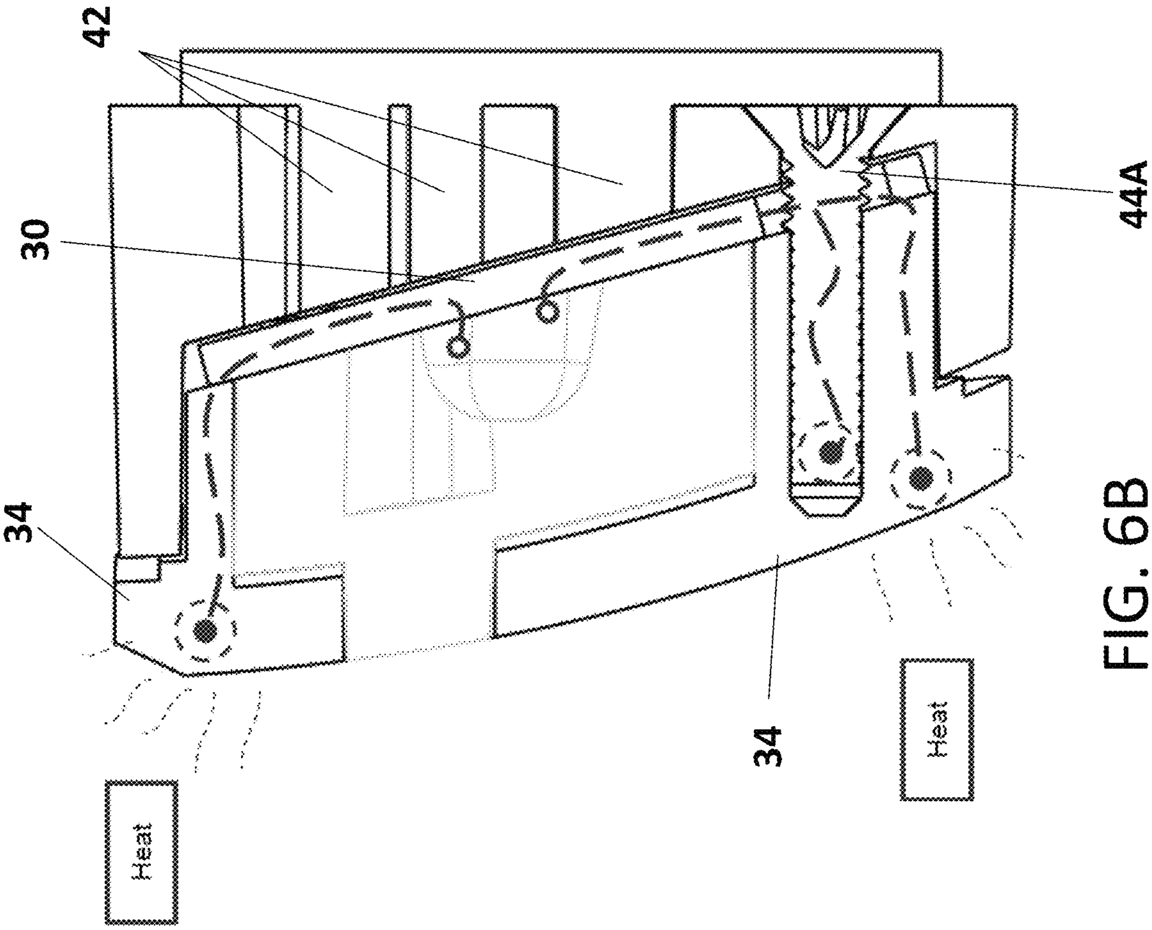
FIG. 6B is a cross-sectional view of the spotlight of FIG. 6A taken along line B-B, illustrating dissipation of heat through the heat sink.
Figure 6A:
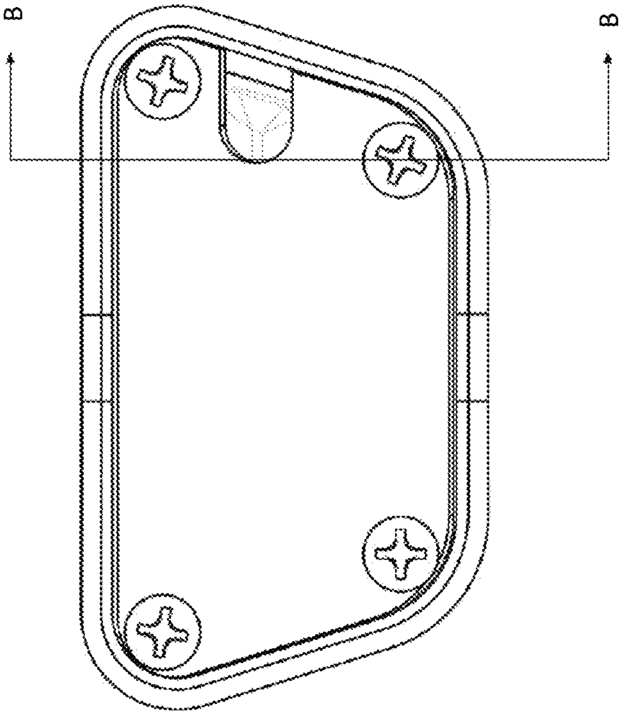
FIG. 6A is a rear view of an embodiment of a directional spotlight for the disclosed headlamp.
Figure 7B:
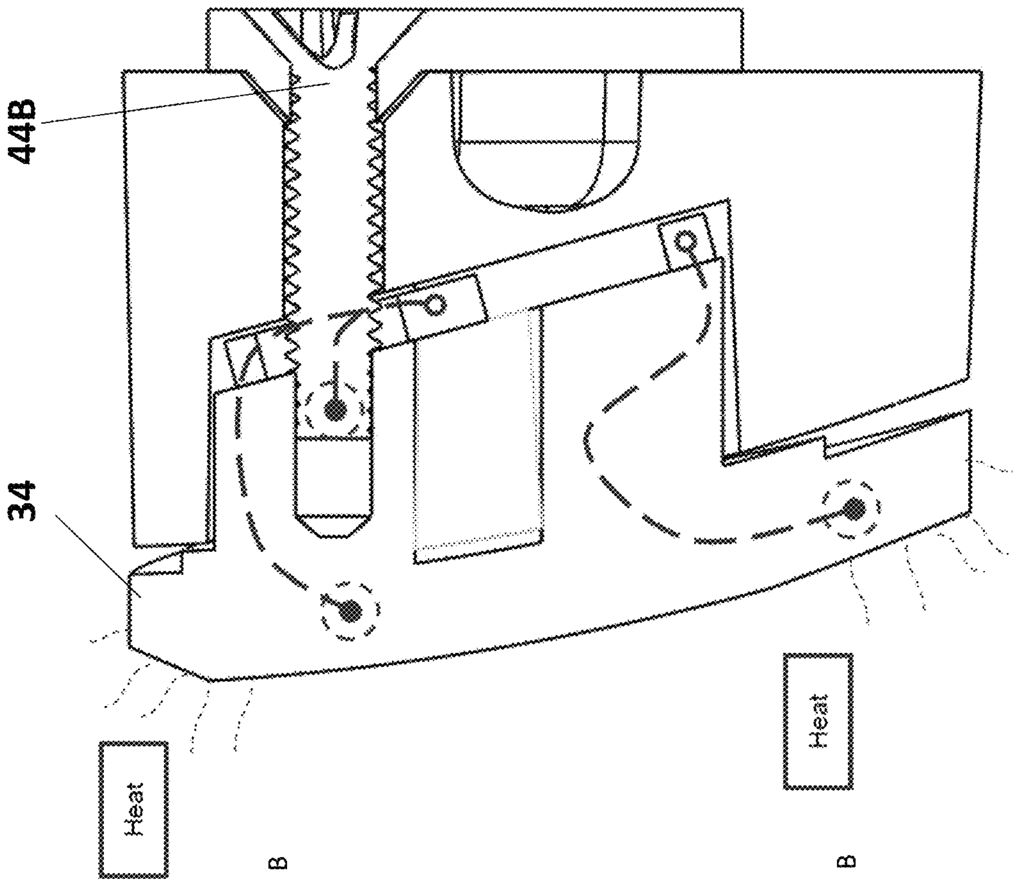
FIG. 7B is a cross-sectional view of the spotlight of FIG. 7A taken along line B-B, illustrating dissipation of heat through the heat sink.
Figure 7A:
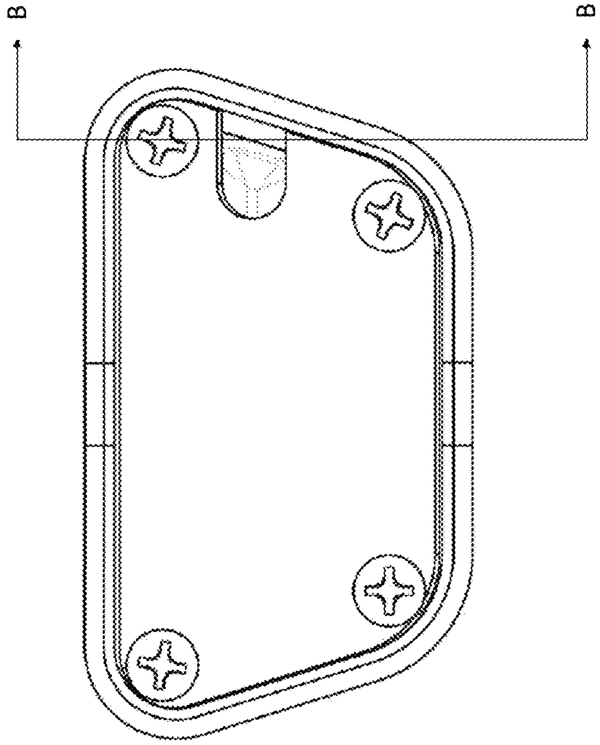
FIG. 7A is a rear view of an embodiment of a directional spotlight for the disclosed headlamp.

Referring to FIGS. 4-7, several cross-sectional views of the second light source 16 are illustrated. In FIG. 4, a vertical cross-section at a midpoint of the light, a downward tilt of the spotlight 22 is clear. This feature is useful when the headlamp 10 is worn forward-facing about a user's head, as it illuminates a walking field in front of the user. FIG. 5, also a vertical midpoint cross-section, illustrates the projection of a light beam through the lens 38, as well as dissipation of heat via the front housing plate 34 being in direct contact with the LED PCB 30. FIGS. 6 and 7 illustrate further heat dissipation occurring via the lower screw 44A (FIG. 6) and upper screw 44B (FIG. 7), both of which pass through the LED PCB 30.

In this manner, heat from the LED spotlight 22 is directed away from the user and does not create a build-up of heat which contacts a user. The result is greater comfort to the user during a longer period of use.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A headlamp comprising:

a wearable band configured to be secured to a user;

a first light source comprised of an array of lights arranged along a length of the wearable band in the range of 4 inches to 8 inches and being configured to direct a wide projection of light outward from the wearable band;

a second light source comprised of a spotlight positioned on a circuit board within a housing, wherein the housing comprises a metal front plate, a rear plate, and a frame between the two plates, the housing being attached to the wearable band, and the spotlight being configured to direct a beam of light outward through a lens in the metal front plate of the housing on the wearable band; and a heat sink comprising the metal front plate of the housing contacting the circuit board so as to conduct heat generated by at least the second light source through the metal front plate to an ambient exterior, and wherein the rear plate and the frame are comprised of non-metal to minimize conduction of heat toward the wearable band.

2. The headlamp of claim 1, wherein the array of lights comprises an LED strip.

3. The headlamp of claim 1, wherein the spotlight comprises at least one LED attached to the circuit board.

4. The headlamp of claim 1, wherein the heat sink further comprises metal hardware passing through the housing and into the metal front plate for the directional spotlight.

5. The headlamp of claim 1, wherein control of the first light source is independent of control of the second light source.

6. The headlamp of claim 5, wherein the heat sink expels heat from at least the second light source away from the user.

7. The headlamp of claim 1, wherein the heat sink expels heat from at least the second light source away from the user.

8. A headlamp comprising:

an adjustable band configured to be removably secured to a user;

a first light source comprised of an array of LEDs arranged along a length of the adjustable band in the range of 4 inches to 8 inches and being configured to direct a wide band of light outward from the adjustable band;

a second light source comprised of a spotlight positioned on a circuit board within a housing, wherein the housing comprises a metal front plate, a rear plate, and a frame between the two plates, the housing being attached adjacent the first light source on the adjustable band and configured to direct a beam of light from the spotlight outward through the metal front plate of the housing on the adjustable band; and a heat sink comprising the metal front plate of the housing contacting the circuit board so as to conduct heat generated by the second light source away from the user and through the metal front plate to an ambient exterior, while the rear plate and the frame are comprised of a non-metal to minimize conduction of heat toward the adjustable band.

9. The headlamp of claim 8, wherein the metal front plate comprises an aluminum or aluminum alloy.

10. The headlamp of claim 8, wherein the heat sink further comprises metal hardware passing through the housing and into the metal front plate for the spotlight.

* * * * *